(12) United States Patent
Tranberg et al.

(10) Patent No.: US 9,392,566 B2
(45) Date of Patent: Jul. 12, 2016

(54) AVOIDING UNLIMITED NUMBER OF UNSUCCESSFUL LOCATION UPDATE OR PACKET DATA CONNECTION ESTABLISHMENT ATTEMPTS

(71) Applicant: TELEFONAKTIEBOLAGET L M ERICSSON (PUBL), Stockholm (SE)

(72) Inventors: Håkan Tranberg, Mölnlycke (SE); Lasse Olsson, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 36 days.

(21) Appl. No.: 14/384,951

(22) PCT Filed: Nov. 22, 2012

(86) PCT No.: PCT/EP2012/073381
§ 371 (c)(1),
(2) Date: Sep. 12, 2014

(87) PCT Pub. No.: WO2013/135320
PCT Pub. Date: Sep. 19, 2013

(65) Prior Publication Data
US 2015/0029978 A1    Jan. 29, 2015

Related U.S. Application Data

(60) Provisional application No. 61/610,617, filed on Mar. 14, 2012.

(51) Int. Cl.
*H04W 76/00* (2009.01)
*H04W 60/06* (2009.01)
(Continued)

(52) U.S. Cl.
CPC .............. *H04W 60/06* (2013.01); *H04W 60/04* (2013.01); *H04W 76/027* (2013.01); *H04W 88/16* (2013.01); *H04W 76/022* (2013.01)

(58) Field of Classification Search
CPC . H04W 76/06; H04W 76/062; H04W 76/064; H04W 36/08; H04W 36/0033; H04W 84/045; H04W 60/005; H04W 8/02; H04W 88/16; H04W 60/04; H04W 60/06; H04W 76/022; H04W 76/027; H04W 86/16
USPC ......................................................... 370/329
See application file for complete search history.

(56) References Cited

U.S. PATENT DOCUMENTS

| 8,964,668 B2* | 2/2015 | Rydnell | H04W 76/022 370/329 |
| 2008/0207170 A1* | 8/2008 | Khetawat | H04W 60/005 455/411 |

(Continued)

FOREIGN PATENT DOCUMENTS

| EP | 1655901 A1 | 5/2006 |
| EP | 2315470 A1 | 4/2011 |

OTHER PUBLICATIONS

3GPP "3rd Generation Partnership Project; Technical Specification Group Core Network; Mobile radio interface Layer 3 specification; Core network protocols; Stage 3 (Release 6)", Jan. 2005, 290 pages, XP002376286 Retrieved from the Internet : URL: http://www.3gpp.org/ftp/Specs/archive/24_series/24.008/24008-670.zip, retrieved on Apr. 7, 2006.

(Continued)

*Primary Examiner* — Afsar M Qureshi
(74) *Attorney, Agent, or Firm* — Rothwell, Figg, Ernst & Manbeck, P.C.

(57) ABSTRACT

The application relates to the procedures Routing Area Update RAU in UTRAN and Tracking Area Update TAU in LTE. Furthermore, it relates to PDP context procedure in UTRAN as well as PDN connection procedure in LTE. In the current RAU procedure, a SGSN, which fails to update the Routing Area, e.g. because it receives the DNS return error, sends a RAU Reject with the cause code CC#17 indicating a network failure back to the user equipment (114*b*). The cause code CC#17 in the RAU Reject causes the user equipment to send a new RAU Request. Thus, the user equipment is stuck in a loop of sending a RAU Request and receiving a RAU Reject. This problem is solved by the present application in that SGSN keeps track of the number of rejections when doing RAU. When the number of rejections is above a certain threshold, the SGSN will send a RAU Reject with cause code CC#10 to the user equipment (115*b*), whereby the cause code CC#10 indicates implicit detach of the user equipment. In other words, the cause code is changed from CC#17 to CC#10 and in order to avoid further looping. The same principle is applied to TAU in LTE as well as to PDP procedures in UTRAN and LTE.

22 Claims, 6 Drawing Sheets

(51) Int. Cl.
*H04W 60/04* (2009.01)
*H04W 88/16* (2009.01)
*H04W 76/02* (2009.01)

(56) References Cited

U.S. PATENT DOCUMENTS

2010/0081435 A1    4/2010  Huang
2011/0261715 A1*  10/2011  Norefors ............... H04W 60/00
                                                          370/252
2012/0076121 A1*   3/2012  Choi ................... H04W 76/062
                                                          370/338

OTHER PUBLICATIONS

Ericsson, et al. "MME mapping between Diameter error codes and NAS Cause Code values", 3GPP TSG CT 4 Meeting #49; Kyoto Japan, May 10-14, 2010; c4-101546, 4 pages, XP050412089.

Chen, et al., "IP-Based Next-Generation Wireless Networks" Systems, Architectures, and Protocols, Jan. 9, 2004, 96 pages.

* cited by examiner

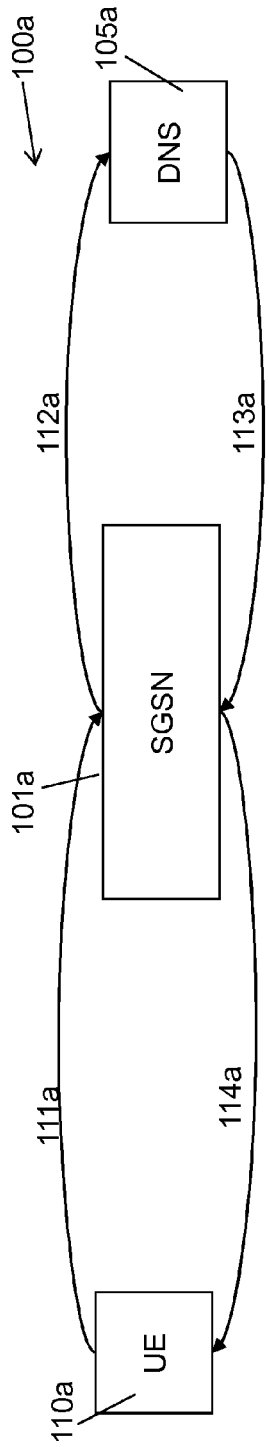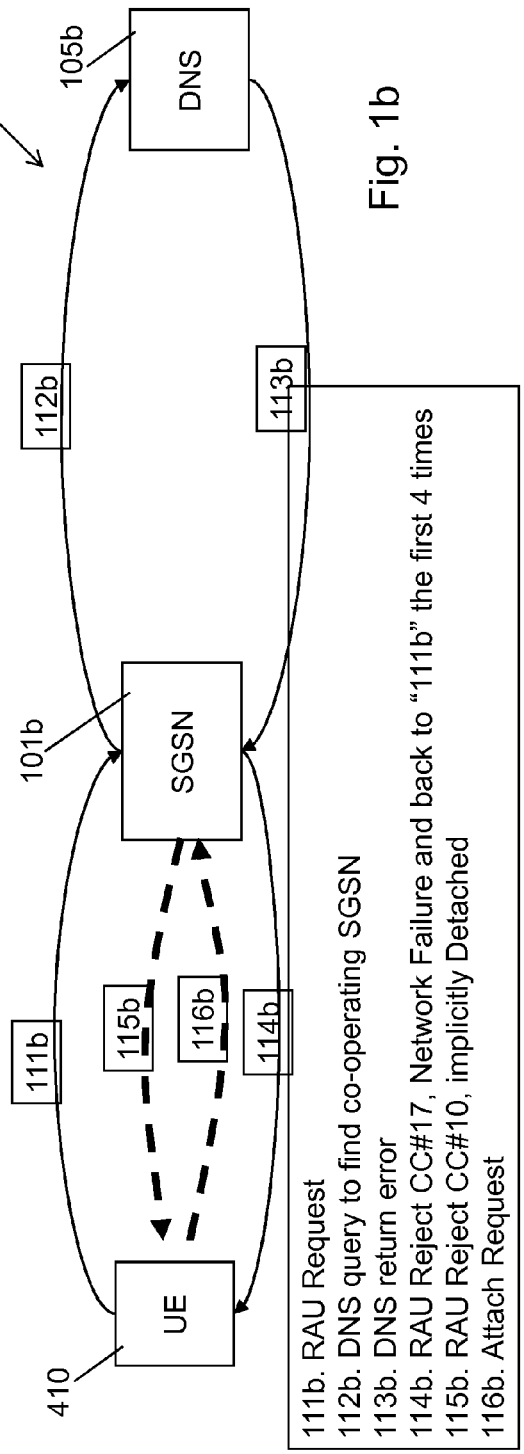

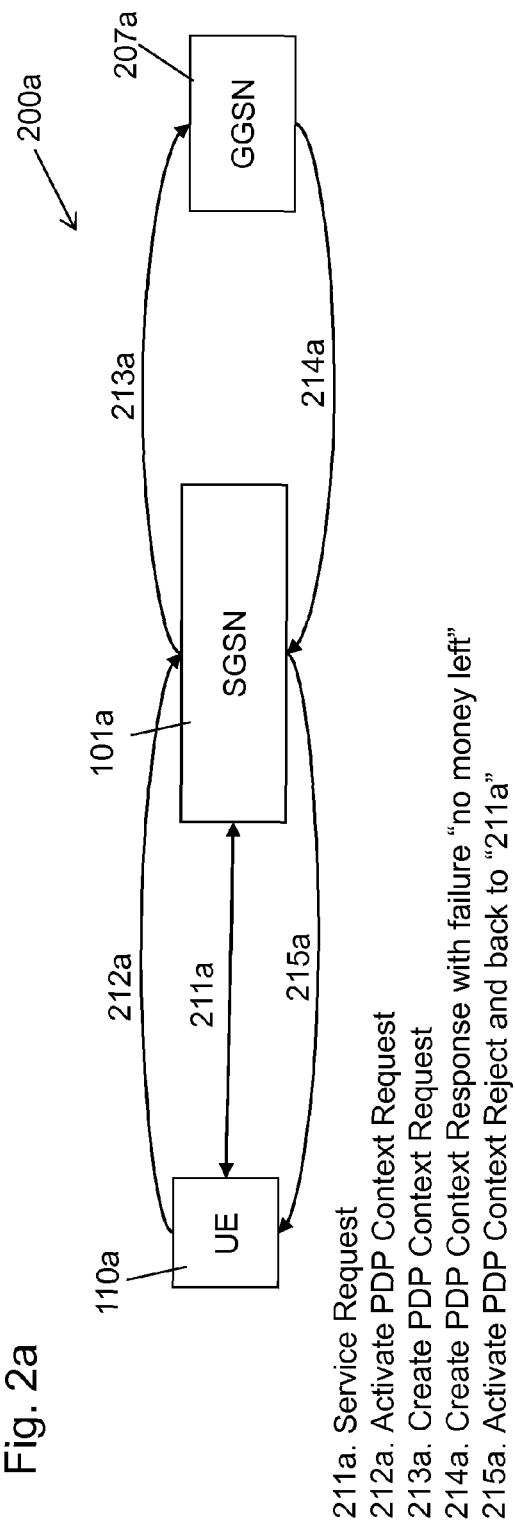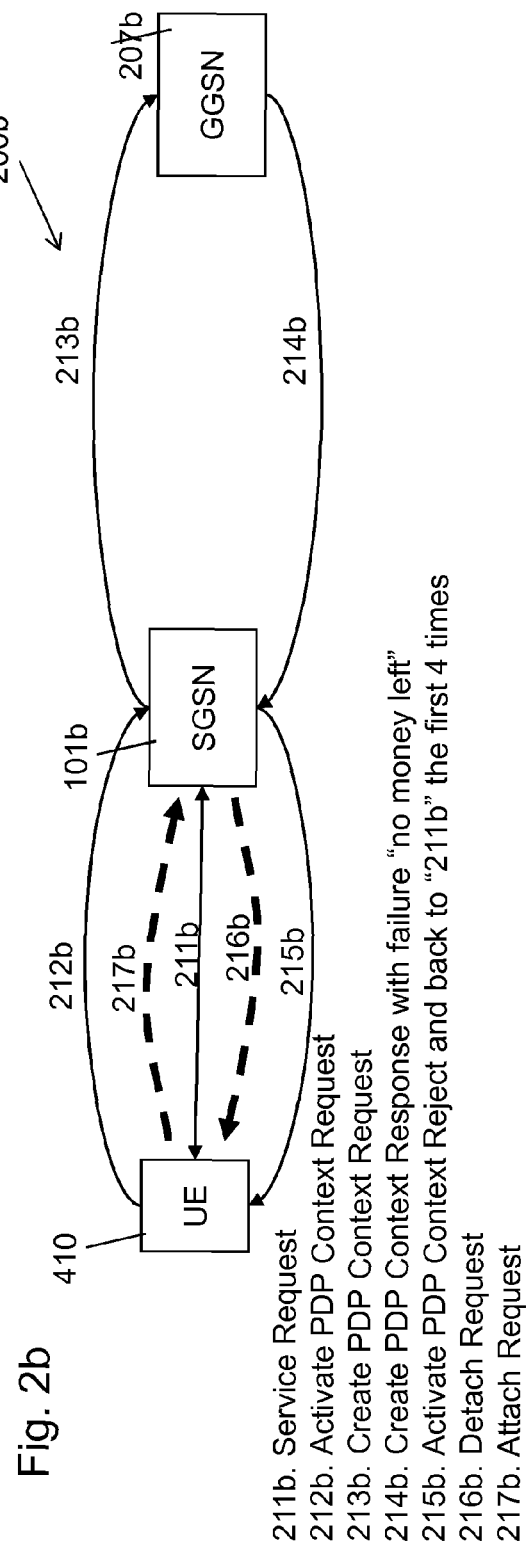

Fig. 2a

211a. Service Request
212a. Activate PDP Context Request
213a. Create PDP Context Request
214a. Create PDP Context Response with failure "no money left"
215a. Activate PDP Context Reject and back to "211a"

Fig. 2b

211b. Service Request
212b. Activate PDP Context Request
213b. Create PDP Context Request
214b. Create PDP Context Response with failure "no money left"
215b. Activate PDP Context Reject and back to "211b" the first 4 times
216b. Detach Request
217b. Attach Request 311a. Service Request
312a. Activate PDP Context Request
313a. APN does not exist
314a. Activate PDP Context Reject and back to "311a"

311b. Service Request
312b. Activate PDP Context Request
313b. APN does not exist or "No money" etc.....
314b. Activate PDP Context Reject and back to "311b" the first 4 times
315b. Detach Request
316b. Attach Request

AVOIDING UNLIMITED NUMBER OF UNSUCCESSFUL LOCATION UPDATE OR PACKET DATA CONNECTION ESTABLISHMENT ATTEMPTS

CROSS REFERENCE TO RELATED APPLICATION(S)

This application is a 35 U.S.C. §371 National Phase Entry Application from PCT/EP2012/073381 filed Nov. 22, 2012, which claims priority to U.S. Provisional Application No. 61/610,617, filed Mar. 14, 2012. The above identified applications are incorporated by reference in their entirety.

TECHNICAL FIELD

Embodiments herein relate generally to a first network node and a method in the first network node. More particularly the embodiments herein relate to handling a user equipment.

BACKGROUND

In a typical cellular network, also referred to as a wireless communication system, User Equipments (UEs), communicate via a Radio Access Network (RAN) to one or more Core Networks (CNs).

A user equipment is a mobile terminal by which a subscriber may access services offered by an operator's core network and services outside the operator's network to which the operator's radio access network and core network provide access. The user equipment may be for example a communication device such as mobile telephone, cellular telephone, smart phone, tablet computer, Machine to Machine (M2M) device or laptop with wireless capability. The user equipment may be portable, pocket storable, hand held, computer comprised, or a vehicle mounted mobile device, enabled to communicate voice and/or data, via the radio access network, with another entity, such as another mobile station or a server. The user equipment is enabled to communicate wirelessly in the communication network. The communication may be performed e.g. between two user equipments, between a user equipment and a regular telephone and/or between the user equipment and a server via the radio access network and possibly one or more core networks, comprised within the communication network.

The radio access network covers a geographical area which is divided into cell areas. Each cell area is served by a Base Station (BS), e.g. a Radio Base Station (RBS), which in some radio access networks is also called evolved NodeB (eNB), NodeB or B node. A cell is a geographical area where radio coverage is provided by the radio base station at a base station site. Each cell is identified by an identity within the local radio area, which is broadcast in the cell. The base stations communicate over the air interface operating on radio frequencies with the user equipments within range of the base stations.

A user equipment that does not follow the third Generation Partnership Project (3GPP) standard may end up in an eternal signaling loop consuming radio access network and core network resources, beside the fact that they never get service until a manual power cycle or a Denial-Of-Service attack (DOS) occurs.

In GERAN/UTRAN, a Routing Area Update (RAU) procedure is used to update the Routing Area (RA) of the user equipment when the user equipment moves from one routing area to another. In Long Term Evolution (LTE), the corresponding procedure is Tracking Area Update (TAU). The user equipment initiates TAU when it detects that it enters a new Tracking Area (TA). The routing area or tracking area is a geographical area within a Public Land Mobile Network (PLMN). When the RAU cannot be accepted, the network sends a RAU Reject message to the user equipment. The RAU Reject message comprises a Cause Code (CC) value indicating the cause of the rejection. For example, from an operator perspective some user equipments seem to be difficult when receiving the RAU Reject message comprising the error cause indicator CC#17. The CC#17 in the RAU Reject message indicates that the cause of the rejection is a network failure. This is similar for the TAU procedure. GERAN is short for GSM EDGE Radio Access Network, GSM is short for Global System for Mobile Communications and EDGE is short for Enhanced Data rates for GSM Evolution. UTRAN is an abbreviation for Universal Terrestrial Radio Access Network.

Considering the following example data traffic scenario:
1) The user equipment performs Inter Radio Access Technology (IRAT) mobility by moving from 2G to 3G, i.e. from GSM to WCDMA.
2) The user equipment is rejected by the Serving General packet radio service Support Node (SGSN) with a CC#17 message. There may be many different reasons to why the SGSN rejects the user equipment with a CC#17.

When scenario 1) or 2) happens, the user equipment will not re-attach, instead it will be looping by sending another RAU Request to the SGSN and receiving a RAU Reject CC#17 from the SGSN again. IRAT mobility, as mentioned above, refers to mobility of a user equipment between LTE and earlier 3GPP technologies.

FIG. 1a illustrates a current example of a RAU procedure. The RAU procedure is initiated by the user equipment when it leaves one routing area and enters another. FIG. 1a illustrates a communication network 100a comprising a SGSN 101a, a Domain Name System (DNS) server 105a and a user equipment 110a. The user equipment 110a has moved from one routing area to another routing area. The SGSN 101a is responsible for delivery of data packets to and from the user equipment(s) within its geographical service area. The tasks of the SGSN 101a comprise packet routing and transfer, mobility management (attach/detach and location management), logical link management, and authentication and charging functions. The SGSN 101a stores location information and user profiles of all General Packet Radio Service (GPRS) user equipments 110a registered with the SGSN 101a. Simplified, the DNS 105a is an internet service that connects domain names to Internet Protocol (IP) addresses, i.e. it translates the domain names into IP addresses. The RAU procedure exemplified in FIG. 1a comprises the following steps, which steps may be performed in any suitable order:

Step 111a

The user equipment 110a sends a RAU Request to the SGSN 101a when it leaves one routing area and enters another. A change from an old SGSN to the SGSN 101a also occurs.

Step 112a

The SGSN 101a receives the RAU Request and sends a DNS query to the DNS 105a in order to find a cooperating old SGSN. The term old used together with the SGSN refers to the SGSN located in the previous routing area from which the user equipment 110a has moved.

Step 113a

The DNS 105a receives the DNS query from the SGSN 101a and translates it into an IP address for the purpose of locating the co-operating SGSN. By some reason, the DNS 105a does not find the co-operating old SGSN, and therefore sends a DNS return error back to the SGSN 101a.

Step 114a

The SGSN 101a receives the DNS return error from the DNS 105a and sends a RAU Reject with the cause code CC#17 indicating a network failure back to the user equipment 110a. The RAU Reject CC#17 causes the user equipment 110a to go back to step 111a and to send a new RAU Request. Thus, the user equipment 110a is stuck in a loop of sending a RAU Request and receiving a RAU Reject. The information retrieved from the DNS 105a may be locally configured in the SGSN 101a.

FIG. 2a illustrates another example of a communication network 200a and a Packet Data Protocol (PDP) procedure. The communication network 200a comprises the user equipment 110a, the SGSN 101a and a Gateway GPRS Support Node (GGSN) 207a. The GGSN 207a is responsible for the interworking between the GPRS network and external Packet Switched (PS) networks. The GGSN 207a has a record comprising information of active user equipments and the SGSNs to which the user equipments are attached, whereof one user equipment is the user equipment 110a. The GGSN 207a allocates IP addresses to user equipment 110a and is responsible for billing.

PDP is a packet transfer protocol used in communication networks. A PDP context is a term indicating a logical associated between the user equipment 110a and a Public Data Network (PDN) running across a GPRS network. A PDP context activation may be initiated by the user equipment 110a or it may be requested by the network. After a PDP context activation, the user equipment 110a may send IP packets over the air interface to the base station. The user equipment 110a may have several active PDP contexts at the same time.

The PDP procedure exemplified in FIG. 2a comprises the following steps, which steps may be performed in any suitable order:

Step 211a

The user equipment 110a sends a service request to the SGSN 101a. The service request is sent for example because the user equipment 110a has pending uplink signaling. A signaling connection is established between the user equipment 110a and the SGSN 101a as a result of the service request.

Step 212a

The user equipment 110a sends an Activate PDP Context request to the SGSN 101a in order to activate a PDP context. The Activate PDP Context changes a session management state to active.

Step 213a

The SGSN 101a receives the Activate PDP Context request from the user equipment 110a and sends a Create PDP Context Request to the GGSN 207a.

Step 214a

The GGSN 207a receives and examines the Create PDP Context Request. As mentioned above, the GGSN is responsible for billing and may therefore be able to perform a credit control for user equipment 110a, i.e. subscriber. If the credit control performed by the GGSN 207a detected that there is no money left on an account associated with the user equipment 110a, the GGSN 207a sends a Create PDP Context Response to the SGSN 101a indicating that the failure is due to that there is no money left.

Step 215a

The SGSN 101a receives the Create PDP Context Response from the GGSN 207a and sends an Activate PDP Context Reject back to the user equipment 110a. The procedure the goes back to step 211a, i.e. user equipment 110a is stuck in the loop.

FIG. 3a illustrates another example of a communication network 300a and a PDP procedure. The communication network 300a comprises the user equipment 110a and the SGSN 101a. The procedure comprises the following steps, which steps may be performed in any suitable order:

Step 311a

The user equipment 110a sends a service request to the SGSN 101a. The service request is sent for example because the user equipment 110a has pending uplink signaling. A signaling connection is established between the user equipment 110a and the SGSN 101a as a result of the service request.

Step 312a

The user equipment 110a sends an Activate PDP Context request to the SGSN 101a in order to activate a PDP context. The Activate PDP Context changes the session management state to active.

Step 313a

The SGSN 101a receives the Activate PDP Context request from the user equipment 110a and checks whether the Access Point Name (APN) exist. APN allows the user equipment 110a to access the Internet. The APN may be seen as a name (web address) of an access point or gateway towards Internet. In this example, the SGSN 101a determines that the APN does not exist.

Step 314a

When the SGSN 101a has determined that the APN does not exist, it sends an Activate PDP Context Reject to the user equipment 110a. This causes the user equipment 110a to go back to step 311a, i.e. it is stuck in the loop of sending a request and receiving a rejection.

As described in the examples in FIGS. 1a, 2a and 3a, the user equipment is stuck in the loop of sending a request and receiving a rejection. Thus, the user equipment 110a consumes unnecessary radio access network resources and an unnecessary amount of signaling is transmitted in the network.

SUMMARY

An objective of embodiments herein is therefore to obviate at least one of the above disadvantages and to provide improved handling of user equipments in a communication network.

According to a first aspect, the object is achieved by a method in a first network node for handling a user equipment in a communication network. The first network node is connected to the user equipment. The first network node receives a request message from the user equipment. The request message is a request for an update related to an area to which the user equipment has moved, or the request message is a request for transmitting data in the communication network. The first network node obtains information about rejection of the request message and increases a parameter indicating a number of rejections associated with the user equipment based on the obtained information. The first network node transmits, to the user equipment, instructions to detach the user equipment from the first network node when the parameter is above the threshold.

According to a second aspect, the object is achieved by a first network node for handling a user equipment in a communication network. The first network node is configured to be connected to the user equipment. The first network node comprises a receiver which is configured to receive a request message from the user equipment. The request message is a request for an update related to an area to which the user equipment is configured to move, or the request message is a request for transmitting data in the communication network. The receiver is further configured to obtain information about rejection of the request message. The first network node comprises a processor which is configured to increase a parameter indicating a number of rejections associated with the user equipment based on the obtained information. The first network node comprises a transmitter configured to transmit, to the user equipment, instructions to detach the user equipment from the first network node when the parameter is above the threshold.

Since the first network node transmits instructions to detach the user equipment from the first network node when the parameter is above the threshold and thereby the user equipment is not stuck in a loop, the handling of the user equipment in the communication network is improved.

Embodiments herein afford many advantages, of which a non-exhaustive list of examples follows:

The embodiments herein give the user equipment a chance to re-connect to the PC/Evolved Packet Core (EPC) without any manual power cycle, i.e. without any need to manually move the user equipment out of the loop.

The embodiments herein provide the advantage of saving core network resources by less signaling since it is not stuck in the loop.

The embodiments herein set the user equipment free from the loop, and make it possible to perform user equipment service when the user equipment is set free.

Another advantage of the embodiments herein is that they save radio access network resources by less signaling.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which:

FIGS. 1a and 1b are schematic block diagrams illustrating embodiments of a RAU procedure.

FIGS. 2a and 2b are schematic block diagrams illustrating embodiments of a PDP procedure.

The drawings are not necessarily to scale and the dimensions of certain features may have been exaggerated for the sake of clarity. Emphasis is instead placed upon illustrating the principle of the embodiments herein.

DETAILED DESCRIPTION

The embodiments herein relate to identifying a user equipment that is stuck in a loop of transmitting request messages and receiving reject messages, and then take action to get it in line again, i.e. to get it out of the loop. The embodiments herein may be based but not limited to rejection rate per cause code.

The SGSN/Mobility Management Entity (MME) has a memory that is configured to store information that may keep track of a user equipment that is rejected when doing e.g. RAU/TAU and/or keep track of user equipments that are rejected when doing e.g. PDP activation (with no other PDPs active). The memory record may be a sliding window of e.g. 10 minutes in order not to consume too many resources. Furthermore, information indicating the manufacturer of the user equipment using the International Mobile Equipment Identity (IMEI) and information indicating the Individual subscriber using the International Mobile Subscriber Identity (IMSI) is logged.

When a user equipment is rejected when it performs RAU/TAU or PDP (with no other PDPs active) within a time period of e.g. 8 minutes, using the same cause code, the following action may be executed:

for RAU/TAU→Return a RAU/TAU Reject message with e.g. CC#10.

for PDP→Force the user equipment to detach, re-attach not required.

The CC and "re-attach" option may be operator configurable options and this is also valid for EPC, MME.

The CC#10 cause code may be used to get the user equipment out of the loop. CC#10 indicates implicitly detached. CC#10 may be sent to the user equipment either if the network has implicitly detached the user equipment e.g. some while after the user equipment reachable timer has expired, or if the GPRS Mobility Management (GMM) context data related to the user equipment subscription does not exist in the SGSN e.g. because of a SGSN restart.

Figure 4:
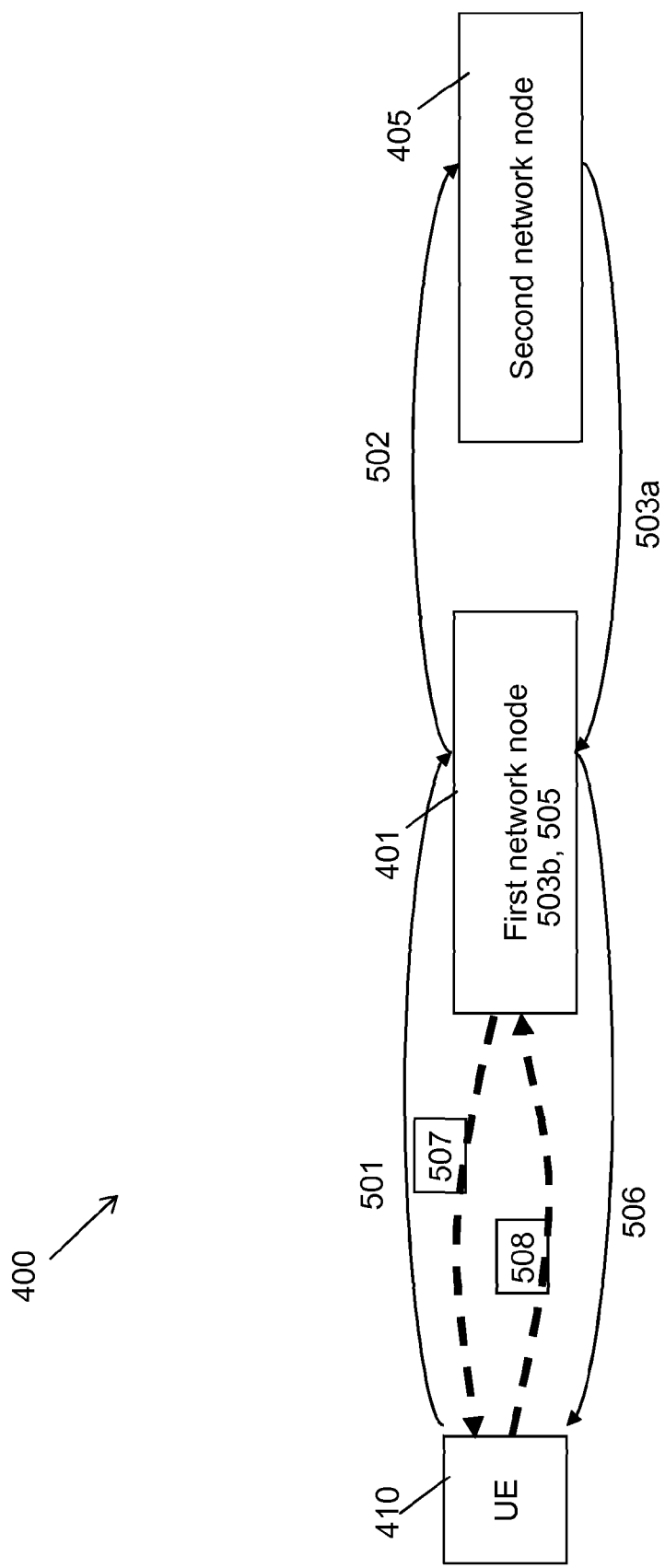
FIG. 4 is a schematic block diagram illustrating embodiments of a communication network.

FIG. 4 depicts a communication network 400 in which embodiments herein may be implemented. The communication network 400 may in some embodiments apply to one or more radio access technologies such as for example LTE, LTE Advanced, Wideband Code Division Multiple Access (WCDMA), GSM, or any other 3GPP radio access technology. The wireless communication network 400 comprises a first network node 401 capable of communicating with a second network node 405 and a user equipment 410.

The user equipment 410 may be present within a cell (not shown) and served by a base station (not shown). The base station may be a base station such as a NodeB, an eNodeB, or any other network unit capable to communicate over a radio carrier with the user equipment 410 being present in the cell. The user equipment 410 may be any suitable communication device or computational device with communication capabilities capable to communicate with a base station over a radio channel, for instance but not limited to mobile phone, smart phone, Personal Digital Assistant (PDA), tablet computer, laptop, MP3 player or portable DVD player (or similar media content devices), digital camera, or even stationary devices such as a PC. A PC may also be connected via a mobile station as the end station of the broadcasted/multicast media. The user equipment 410 may also be an embedded communication device in e.g. electronic photo frames, cardiac surveillance equipment, intrusion or other surveillance equipment, weather data monitoring systems, vehicle, car or transport communication equipment, etc. The user equipment 410 is referred to as UE in some of the figures.

The first network node 401 may be a SGSN, a MME or a combined SGSN and MME. As mentioned above, the SGSN is a node which is responsible for delivery of data packets to and from the user equipments within its geographical service area. Its tasks comprise packet routing and transfer, mobility management such as e.g. attach/detach and location management, logical link management, and authentication and charging functions. The SGSN stores location information and user profiles of all user equipments 410 registered with the SGSN. The MME is a control node in an LTE network. The MME is responsible for idle mode user equipment tracking and paging procedure including retransmissions. It is involved in the bearer activation/deactivation process and is also responsible for choosing a Serving GateWay (SGW) for a user equipment at the initial attach and at time of intra-LTE handover involving core network node relocation. A combined SGSN-MME may comprise SGSN functionality for GSM and WCDMA access, and MME functionality for LTE and EPC, i.e. it provides packet-data switching and mobility/session management in GSM, WCDMA and LTE networks.

The second network node 405 may be a DNS, a GGSN, a SGW/PDN Gateway (PGW) or a Remote Authentication Dial-In User Service (RADIUS) server.

As mentioned above, a DNS is an internet service that connects domain names to IP addresses, i.e. it translates the domain names into IP addresses. DNS may be short for Domain Name System or Directory Name Service. The GGSN is responsible for the interworking between the GPRS network and external PS networks. The GGSN comprises a record of active user equipments 410 and the SGSNs to which the user equipment 410 is attached. It allocates IP addresses to user equipments 410 and is responsible for billing.

A SGW is a node which routes and forwards user data packets, while also acting as the mobility anchor for the user plane during inter-eNodeB handovers and as the anchor for mobility between LTE and other 3GPP technologies when a S4 architecture is used. The PGW provides connectivity from the user equipment 410 to external packet data networks by being the point of exit and entry of traffic for the user equipment 410. The PGW performs policy enforcement, packet filtering for the user equipment 410 and acts as an anchor for mobility between 3GPP, 3GPP (when a Gn architecture is used) and non-3GPP technologies. A combined SGW/PGW comprises all functions of a SGW and a PGW. S4 is the interface between SWG and SGSN. Gn is the interface between two SGSNs within the same PLMN.

A radius server controls, manages and authorizes access of the user equipment 410 to a network.

The reference numbers 501-508 seen in FIG. 4 will be described later in relation to FIG. 5.

FIG. 1b is a schematic flow chart illustrating embodiments of an example RAU procedure. Note that FIG. 1b is also applicable for a TAU procedure. FIG. 1b illustrates an example communication network 100b comprising the user equipment 410, a SGSN 101b and a DNS 105b. The SGSN 101b corresponds to the first network node 401 illustrated in FIG. 4 and the DNS 105b corresponds to the second network node 405 illustrated in FIG. 4. The RAU procedure comprises the following steps, which steps may performed in any suitable order:

Step 111b

The user equipment 410 sends a RAU Request to the SGSN 101b when it leaves one routing area and enters another. A change from an old SGSN to the SGSN 101b also occurs.

Step 112b

The SGSN 101b receives the RAU Request and sends a DNS query to the DNS 105b in order to find a co-operating "old" SGSN (not shown).

Step 113b

The DNS 105b receives the DNS query from the SGSN 101b and translates it into an IP address for the purpose of locating the co-operating "old" SGSN. The DNS 105b does not find the co-operating "old" SGSN, and sends therefore a DNS return error back to the SGSN 101b.

The SGSN 101b comprises a memory 603 where it may keep track of the user equipment 410 that is rejected when doing RAU/TAU. The SGSN 101b may keep track of this by using a parameter, stored in the memory 603, indicating a number of rejections associated with the user equipment 410. The reference number 603 refers to FIG. 6, which will be described in more detail later. Every time the SGSN 101b receives a DNS return error from the DNS 105b, the SGSN 101b increases the parameter with e.g. one unit. The memory 603 may be a sliding window of e.g. 10 minutes in order not to consume too many resources.

Step 114b

The SGSN 101b receives the DNS return error from the DNS 105b and sends a RAU Reject with the cause code CC#17 indicating a network failure back to the user equipment 410. This takes place for example the first four times the SGSN 101b receives a DNS return error. The SGSN 101b determines the value of the parameter, and determines that the number of rejections is for example 0, 1, 2, 3 or 4. The RAU Reject CC#17 causes the user equipment 410 to go back to step 111b and the user equipment 410 sends a new RAU Request. Note that CC#17 is only used as an example, and that other causes may also be used.

Step 115b

When the SGSN 101b has determined that the value of the parameter to be larger than 4, i.e. the user equipment 410 has been rejected more than for example four times, the SGSN 101b sends a RAU Reject CC#10 to the user equipment 410, where the cause code CC#10 indicates implicit detach of the user equipment 410. In other words, the cause code is changed from CC#17 to CC#10. Note that CC#10 is only used as an example, and that other causes may also be used.

Step 116b

When the user equipment 410 has been detached as a result of the CC#10 indication, the user equipment 410 sends an attach request to the SGSN 101b.

Instead of sending a query to the DNS 105b to find the co-operating SGSN, the SGSN 101b may obtain information about the co-operating SGSN internally within the SGSN 101b itself or directly from the co-operating SGSN by sending a request to the co-operating SGSN.

FIG. 2b is a schematic flow chart illustrating embodiments of an example PDP procedure. The PDP procedure may be a PDP context procedure or a PDN connection procedure. In FIG. 2b, the exemplified procedure is the PDP context procedure, but the method is equally applicable to a PDN connection procedure. FIG. 2b illustrates an example communication network 200b comprising the user equipment 410, a SGSN 101b and a GGSN 207b. The SGSN 101b corresponds to the first network node 401 illustrated in FIG. 4 and the GGSN 207b corresponds to the second network node 405 illustrated in FIG. 4. The PDP procedure comprises the following steps, which steps may performed in any suitable order:

Step 211b

The user equipment 410 sends a service request to the SGSN 101b. The service request is sent for example because the user equipment 410 has pending uplink signaling. A signaling connection is established between the user equipment 410 and the SGSN 101b as a result of the service request.

Step 212b

The user equipment 410 sends an Activate PDP Context request to the SGSN 101b in order to activate a PDP context. The Activate PDP Context changes the session management state to active.

Step 213b

The SGSN 101b receives the Activate PDP Context request from the user equipment 410 and sends a Create PDP Context Request to the GGSN 207b.

Step 214b

The GGSN 207b receives and examines the Create PDP Context Request. As mentioned above, the GGSN 207b is responsible for billing and may therefore be able to perform a credit control for user equipment 410, i.e. subscriber. If the credit control performed by the GGSN 207b detects that the user equipment 410 has no money left on its account, the GGSN 207b sends a Create PDP Context Response comprising an indication that the failure is due to that there is no money left.

Step 215b

The SGSN 101b receives the Create PDP Context Response from the GGSN 207b and sends an Activate PDP Context Reject indicating a failure back to the user equipment 410. The SGSN 101b may keep track of the user equipment 410 that is rejected when doing PDP, e.g. by means of the memory 603. The reference number 603 refers to FIG. 6 and will be described in more detail later. The SGSN 101b may keep track of this by using a parameter, stored in the memory 603, indicating a number of rejections associated with the user equipment 410. Every time the SGSN 101b receives a failure indication from the GGSN 207b, the SGSN 101b increases the parameter with one.

The SGSN 101b sends the Activate PDP Context Reject the first four times the SGSN 101b receives a failure indication from the GGSN 207b. The SGSN 101b determines the value of the parameter, and determines that the number of rejections is for example 0, 1, 2, 3 or 4. The Activate PDP Context Reject causes the user equipment 410 to go back to step 211b.

Step 216b

When the SGSN 101b has determined that the value of the parameter is larger than for example 4, i.e. the user equipment 410 has been rejected more than four times, the SGSN 101b sends Detach Request to the user equipment 410. This causes the user equipment 410 to be detached from the SGSN 101b.

Step 217b

When the user equipment 410 has been detached, the user equipment 410 sends a new attach request to the SGSN 101b.

Figure 3A:
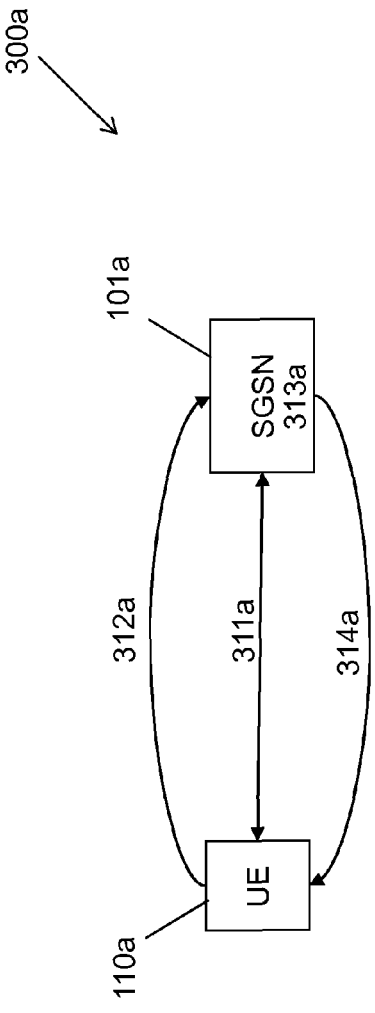
FIGS. 3a and 3b are schematic block diagrams illustrating embodiments of a PDP procedure.
Figure 3B:
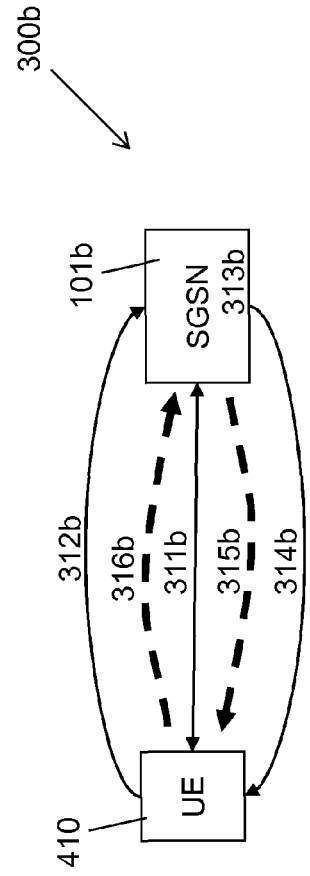

FIG. 3b illustrates another example embodiment of a communication network 300b and a PDP procedure. The PDP procedure may be a PDP context procedure or a PDN connection procedure. In FIG. 3b, the exemplified procedure is the PDP context procedure, but the method is equally applicable to a PDN connection procedure. The communication network 300b comprises the user equipment 410 and the SGSN 101b. The difference between the PDP procedure exemplified in FIG. 3b compared to the PDP procedure exemplified in FIG. 2b is that there is no GGSN involved in the procedure in FIG. 3b. The procedure comprises the following steps, which steps may be performed in any suitable order:

Step 311b

The user equipment 410 sends a service request to the SGSN 101b. The service request is sent for example because the user equipment 410 has pending uplink signaling. A signaling connection is established between the user equipment 410 and the SGSN 101b as a result of the service request.

Step 312b

The user equipment 410 sends an Activate PDP Context request to the SGSN 101b in order to activate a PDP context. The Activate PDP Context changes the session management state to active.

Step 313b

The SGSN 101b receives the Activate PDP Context request from the user equipment 410 and checks, internally, whether the APN exist. APN is a protocol that allows the user equipment 410 to access the Internet. In this example, the SGSN 101b determines that the APN does not exist. The SGSN 101b comprises the memory 603 where it may keep track of the user equipment 410 that is rejected when doing PDP. The SGSN 101b may keep track of this by using a parameter, stored in the memory 603, indicating a number of rejections associated with the user equipment 410. Every time the SGSN 101b determines that the APN does not exist, the SGSN 101b increases the parameter with one.

Step 314b

When the SGSN 101b has determined that the APN does not exist, it sends an Activate PDP Context Reject to the user equipment 410. This takes place e.g. the first four times the SGSN 101b determines that the APN does not exist. The SGSN 101b determines the value of the parameter, and determines that the number of rejections is for example 0, 1, 2, 3 or 4. After receiving the Activate PDP Context Reject, the user equipment 410 goes back to step 311b.

Step 315b

When the SGSN 101b has determined that the value of the parameter is larger than for example 4, i.e. the user equipment 410 has been rejected more than e.g. four times, the SGSN 101b sends a Detach Request to the user equipment 410, which causes the user equipment 410 to be detached.

Step 316b

When the user equipment 410 has been detached, the user equipment 410 sends an attach request to the SGSN 101b.

The method for handling the user equipment 410, according to some embodiments will now be described seen from the perspective of the first network node 401. The method will be described with reference to FIG. 4 and the flowchart depicted in FIG. 5. FIG. 5 is a flowchart describing the present method in the first network node 401, for handling the user equipment 410. In some embodiments, the first network node 401 is a SGSN 101b, a MME, or a combined SGSN and MME. In some embodiments, the second network node 405 is a DNS 105b, a GGSN 207b, a SGW, PGW or a Radius server. The first network node 101b, 401 is connected to the user equipment 410. The method comprises the following steps to be performed by the first network node 401, which steps may be performed in any suitable order:

Step 501

This step corresponds to step 111b in FIG. 1b, 212b in FIG. 2b and step 312b in FIG. 3b.

The first network node 401 receives a request message from the user equipment 410. The request message is a request for an update related to an area to which the user equipment has moved, or the request message is a request for transmitting data in the communication network, e.g. Attach and Service request, and/or that the user equipment tries 410 to alter/modify a current data profile, e.g. Modify PDP context. The request message may be a RAU Request, TAU Request, an Activate PDN Connection Request or an Activate PDP Context Request. Furthermore, the request may relate to that the user equipment 410 tries to connect to the data network, Step 502

This step corresponds to step 112b in FIG. 1b and step 213b in FIG. 2b. In some embodiments, the first network node 401 transmits information indicating the request message to a second network node 405.

The request message may be for example a DNS Query or a Create PDP Context Request or a create PDN connection request.

Step 503

The first network node 401 obtains information about rejection of the request message.

Step 503a

This is a substep of step 503. This step corresponds to step 113b in FIG. 1b and step 214b in FIG. 2b. In some embodiments, the first network node 401 receives information about the rejection from the second network node 405. The first network node 401 may receive the information via for example a DNS return error message or a Create PDP Context Response or a Create PDN Connection Response.

Step 503b

This is a substep of step 503, and a step that is performed instead of step 503a. This step corresponds to step 313b in FIG. 3. In some embodiments, the first network node 401 determines that the request message should be rejected, i.e. the rejection is determined internally by the first network node 401 itself. For example, the first network node 401 may internally determine that an APN does not exist or that the user equipment 410 is has no money left on its account.

Step 504

Based on the obtained information, the first network node 401 increases a parameter indicating a number of rejections associated with the user equipment 410. The parameter may be for example a counter.

Step 505

In some embodiments, the first network node 401 clears the parameter when a time parameter associated with the rejection information is above a limit. For example, the parameter is cleared after 10 minutes in order not to consume too many resources. The memory record 603 may have a sliding window of for example 10 minutes. Clearing the parameter may involve setting the value of the parameter to zero.

Step 506

This step corresponds to step 114b in FIG. 1b, step 215b in FIG. 2b and step 314b in FIG. 3b. In some embodiments, the first network node 401 transmits a reject message to the user equipment 410 when the parameter is below or at a threshold. For example, when the parameter has a value of 4 or less, i.e. the user equipment 410 has been rejected maximum four times. The reject message may comprise a first cause of the rejection, e.g. a CC#17, which indicates a network failure. The reject message may be for example a RAU Reject or a TAU Reject indicating network failure or an Activate PDP Context Reject or an Activate PDN Connection Reject.

Step 507

This step corresponds to step 115b in FIG. 1b, step 216b in FIG. 2b and step 315b in FIG. 3. The first communications node 401 transmits to the user equipment 410 instructions to detach the user equipment when the parameter is above the threshold, for example above 4. The instructions to detach the user equipment may comprise information indicating a second cause of the rejection, e.g. a CC#10. For example, in a RAU procedure or a TAU procedure, the second cause code may be CC#10 and in a PDP procedure a detach message is triggered and sent to the user equipment 410. Compared to the reject message in in step 506, the cause code is altered from CC#17 to CC#10.

Step 508

This step corresponds to step 116b in FIG. 1b, step 217b in FIG. 2b and step 316b in FIG. 3b. In some embodiments, the first network node 401 receives an attach request message from the user equipment 410 when the user equipment 410 has been detached.

Figure 5:
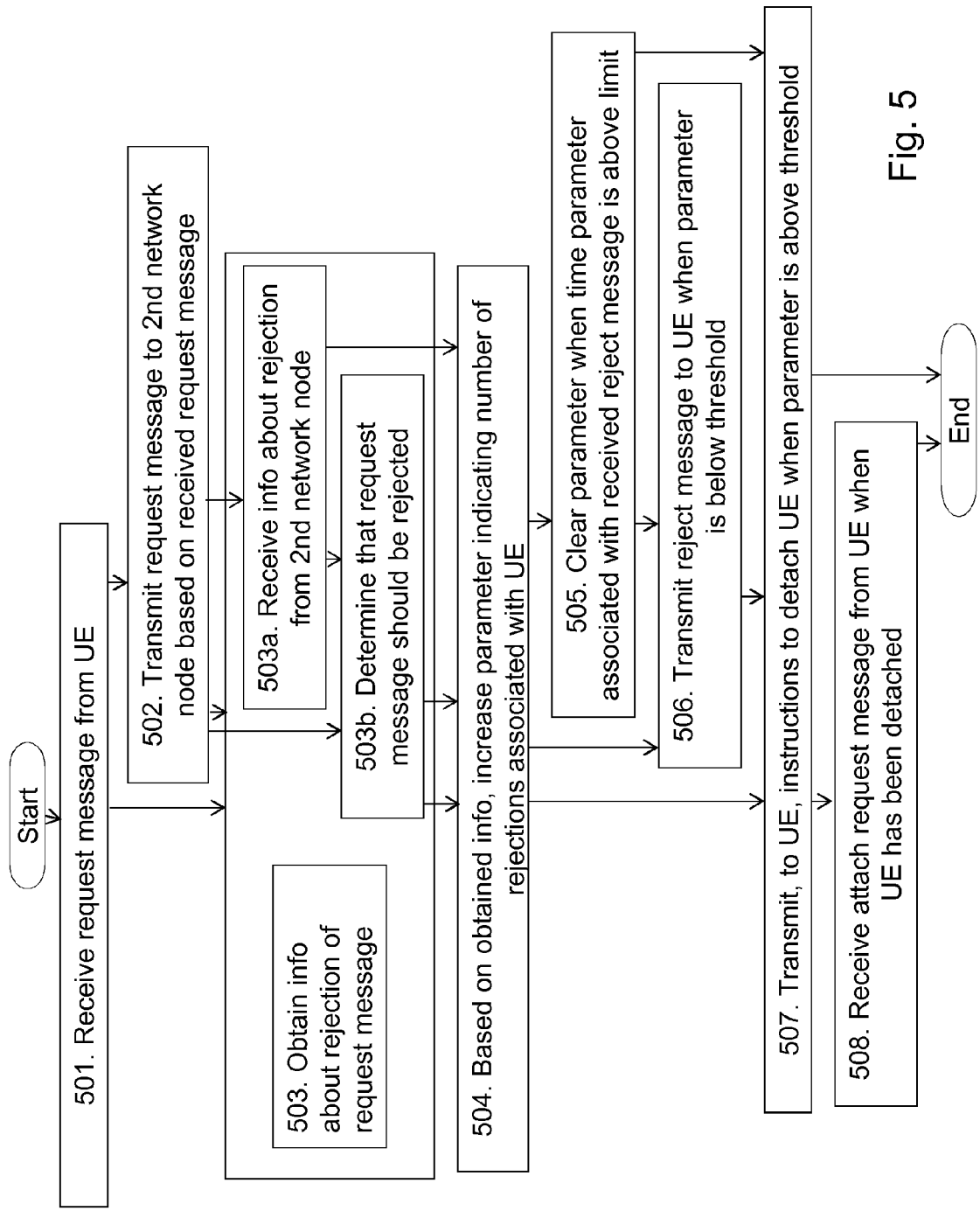
FIG. 5 is a flow chart illustrating embodiments of a method in a first network node.
Figure 6:
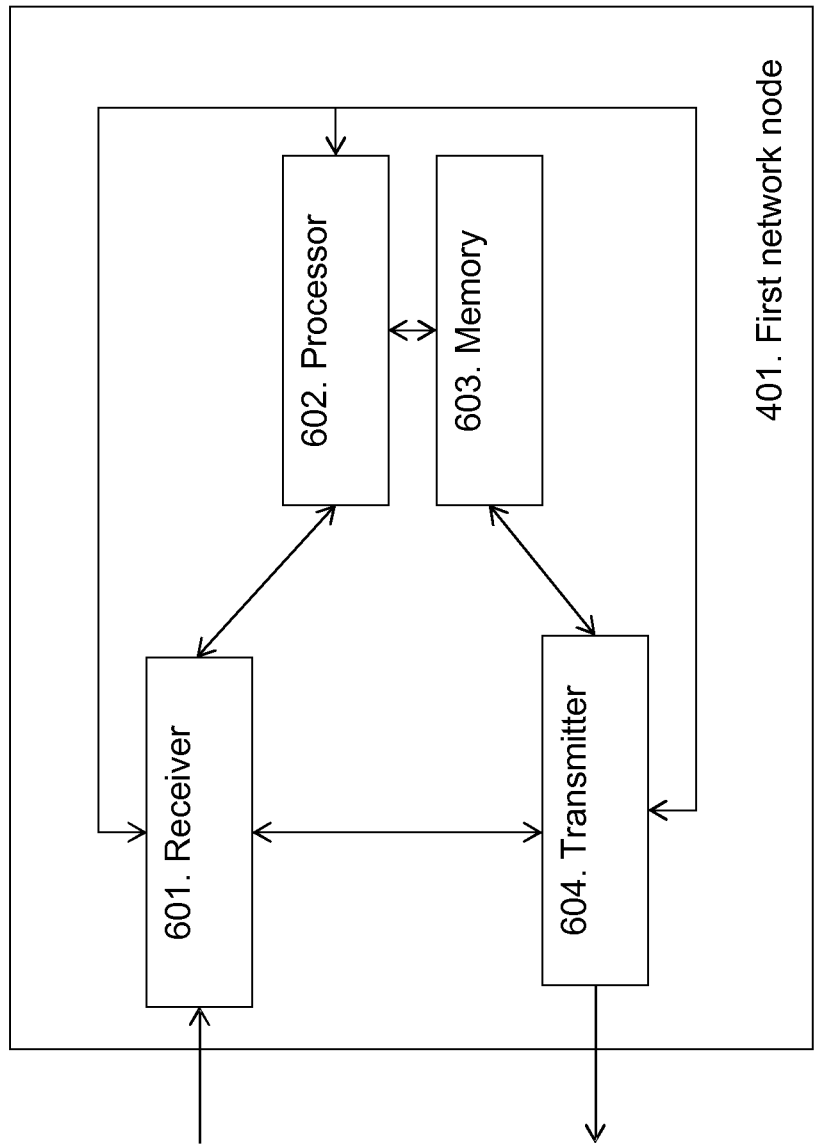
FIG. 6 is a schematic block diagrams illustrating embodiments of a first network node.

To perform the method steps shown in FIG. 5 for handling the user equipment 410 the first network node 401 comprises an arrangement as shown in FIG. 6. The first network node 101b, 401 is configured to be connected to the user equipment 410.

The first network node 401 comprises a receiver 601 which is configured to receive a request message from the user equipment 410, and to obtain information about rejection of the request message. The request message is a request for an update related to an area to which the user equipment 410 has moved, or the request message is a request for transmitting data in the communication network 100b, 200b, 300b, 400. In some embodiments, the receiver 601 is further configured to receive information about the rejection from a second network node 105b, 207b, 405. In some embodiments, the second network node 105b, 207b, 405 is a DNS 105b, or a gateway GGSN 207b, or a SGW, or a PGW or a radius server. In some embodiments, the receiver 601 is further configured to receive an attach request message from the user equipment 410 when the user equipment 410 has been detached.

The first network node 401 comprises a processor 602 configured to increase a parameter indicating the number of rejections associated with the user equipment 410 based on the obtained information. In some embodiments, the processor 602 is further configured to determine that the request message should be rejected. In some embodiments, the processor 602 is further configured to clear the parameter when the time parameter associated with the reject information r is above the limit.

The first network node 401 further comprises a memory 603 in which the parameter may be stored. The memory 603 may comprise one or more memory units. The memory 603 is arranged to be used to store data, received data streams, threshold values, time periods, configurations, schedulings, and applications to perform the methods herein when being executed in the first network node 401. The memory 603 keeps track of the user equipment 410 that is rejected when doing e.g. RAU/TAU or PDP. The memory 603 may be a sliding window of e.g. 10 minutes in order not to consume too many resources.

Furthermore, the first network node 401 comprises a transmitter 604 configured to transmit the reject message to the user equipment 410 when the parameter is below the threshold, and transmit, to the user equipment 410, instructions to detach the user equipment 410 when the parameter is above the threshold. The reject message may comprise a first cause of the rejection, e.g. CC#17. The instructions to detach the user equipment 410 may comprise a second cause of the rejection, such as e.g. CC#10 indicating detach of the user equipment 410. The first cause is different from the second cause. In some embodiments, the transmitter 604 is further configured to transmit information indicating the request message to the second network node 105b, 207b, 405.

The present mechanism for handling a user equipment 410 may be implemented through one or more processors, such as the processor 602 in the first network node 401 depicted in FIG. 6, together with computer program code for performing the functions of the embodiments herein. The processor may be for example a Digital Signal Processor (DSP), Application Specific Integrated Circuit (ASIC) processor, Field-Programmable Gate Array (FPGA) processor or micro processor. The program code mentioned above may also be provided as a computer program product, for instance in the form of a data carrier carrying computer program code for performing the embodiments herein when being loaded into the first network node 401. One such carrier may be in the form of a CD ROM disc. It is however feasible with other data carriers such as a memory stick. The computer program code may furthermore be provided as pure program code on a server and downloaded to the first network node 401.

Those skilled in the art will also appreciate that the receiver 601 and the transmitter 604 described above may refer to a combination of analog and digital circuits, and/or one or more processors configured with software and/or firmware, e.g. stored in a memory, that when executed by the one or more processors such as the processor 602 perform as described above. One or more of these processors, as well as the other digital hardware, may be included in a single ASIC, or several processors and various digital hardware may be distributed among several separate components, whether individually packaged or assembled into a System-on-a-Chip (SoC).

The embodiments herein are not limited to the above described embodiments. Various alternatives, modifications and equivalents may be used. Therefore, the above embodiments should not be taken as limiting the scope of the embodiments.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

It should also be emphasised that the steps of the methods defined in the appended claims may, without departing from the embodiments herein, be performed in another order than the order in which they appear.

The invention claimed is:

1. A method in a first network node for handling a user equipment in a communication network, wherein the first network node is connected to the user equipment, the method comprising:
receiving a request message from the user equipment, which request message is a Routing Area Update, RAU, message or a Tracking Area Update, TAU, message, which RAU or TAU message is a request for an update related to an area to which the user equipment has moved, or
which request message is an activate Packet Data Protocol, PDP, context request message or an activate Packet Data Network, PDN, connection request message, which PDP context request or activate PDN connection request message is a request for transmitting data in the communication network;
obtaining information about rejection of the request message;
increasing a parameter indicating a number of rejections associated with the user equipment based on the obtained information; and
transmitting, to the user equipment, instructions to detach the user equipment from the first network node when the parameter is above a threshold, wherein the instruction to detach the user equipment is comprised in a RAU reject message or a TAU reject message when the received request message is a PDP context request or activate PDN connection request message; and
wherein the instructions to detach the user equipment is comprised in a detach request message when the received request message is an activate PDP context request or activate PDN connection request message; and wherein the first network node is a Serving General packet radio service Support Node, SGSN, or a Mobility Management Entity, MME, or a combined SGSN and MME.

2. The method according to claim 1, further comprising:
transmitting a reject message to the user equipment when the parameter is below the threshold.

3. The method according to claim 2, wherein the reject message comprises an information indicating a first cause of the rejection, and wherein the instructions to detach the user equipment comprises information indicating a second cause of the rejection, which second cause is different from the first cause.

4. The method according to claim 3, wherein the first cause indicates a failure of the communication network, and wherein the second cause indicates detach of the user equipment from the first network node.

5. The method according to claim 1, wherein the obtaining information about rejection of the request message further comprises:
receiving information about the rejection from a second network node, wherein the second network node is a Domain Name Server, DNS or a Gateway General packet radio service Support Node, GGSN or a Serving GateWay, SGW or a Packet data network GateWay, PGW, or a radius server; or
determining that the request message should be rejected.

6. The method according to claim 1, further comprising:
transmitting information indicating the request message to a second network node.

7. The method according to claim 1, further comprising:
clearing the parameter when a time parameter associated with the received rejection information is above a limit.

8. The method according to claim 1, further comprising:
receiving an attach request message from the user equipment when the user equipment has been detached.

9. The method according to claim 1, wherein the information about rejection is obtained by receipt from a Domain Name Server, DNS or internally within the first network node or from a cooperating Serving General packet radio service Support Node, SGSN, when the received request message is a RAU or TAU message and the instructions to detach is comprised in a RAU or TAU reject message.

10. The method according to claim 1, wherein the information about rejection is obtained by receipt from a Gateway General packet radio service Support Node, GGSN, or a Serving GateWay, SGW, or a Packet data network GateWay, PGW, or a radius server, when the received request message is an activate PDP context request or activate PDN connection request message and the instructions to detach is comprised in a detach request message.

11. The method according to claim 1, wherein the information about rejection of the request message is obtained internally within the first network node when the received request message is an activate PDP context request or activate PDN connection request message and the instructions to detach is comprised in a detach request message.

12. A first network node for handling a user equipment in a communication network, wherein the first network node is configured to be connected to the user equipment, the first network node comprising:
a receiver configured to:
receive a request message from the user equipment, which request message is a Routing Area Update, RAU, message or a Tracking Area Update, TAU, message, which RAU or TAU message is a request for an update related to an area to which the user equipment is configured to move, or which request message is an activate Packet Data Protocol, PDP, context request message or an activate Packet Data Network, PDN, connection request message, which PDP context request or activate PDN connection request message is a request for transmitting data in the communication network; and to obtain information about rejection of the request message;

a processor configured to increase a parameter indicating a number of rejections associated with the user equipment based on the obtained information; and a transmitter configured to transmit, to the user equipment, instructions to detach the user equipment from the first network node when the parameter is above a threshold, wherein the instruction to detach the user equipment is comprised in a RAU reject message or a TAU reject message when the received request message is a PDP context request or activate PDN connection request message; and wherein the instructions to detach the user equipment is comprised in a detach request message when the received request message is an activate PDP context request or activate PDN connection request message; and wherein the first network node is a Serving General packet radio service Support Node, SGSN, or a Mobility Management Entity, MME, or a combined SGSN and MME.

13. The first network node according to claim 12, wherein the transmitter is further configured to transmit a reject message to the user equipment when the parameter is below a threshold.

14. The first network node according to claim 13, wherein the reject message comprises an information indicating a first cause of the rejection, and wherein the instructions to detach the user equipment comprises information indicating a second cause of the rejection, which second cause is different from the first cause.

15. The first network node according to claim 12, wherein the first cause indicates a failure of the communication network, and wherein the second cause indicates detach of the user equipment from the first network node.

16. The first network node according to claim 12, wherein the receiver is further configured to receive information about the rejection from a second network node, wherein the second network node is a Domain Name Server, DNS, or a Gateway General packet radio service Support Node, GGSN, or a Serving GateWay, SGW, or a Packet data network GateWay, PGW, or a radius server; and wherein the processor is further configured to determine that the request message should be rejected.

17. The first network node according to claim 12, wherein the transmitter is further configured to transmit information indicating the request message to a second network node.

18. The first network node according to claim 12, wherein the processor is further configured to clear the parameter when a time parameter associated with the rejection information is above a limit.

19. The first network node according to claim 12, wherein the receiver is further configured to receive an attach request message from the user equipment when the user equipment has been detached.

20. The first network node according to claim 13, wherein the receiver is further configured to obtain the information about rejection by receipt from a Domain Name Server, DNS, or internally within the first network node or by receipt from a cooperating Serving General packet radio service Support Node, SGSN when the received request message is a RAU or TAU message and the instructions to detach is comprised in a RAU or TAU reject message.

21. The first network node according to claim 12, wherein the receiver is further configured to obtain the information about rejection of the request message by receipt of the information from a Gateway General packet radio service Support Node, GGSN, or a Serving GateWay, SGW, or a Packet data network GateWay, PGW, or a radius server when the received request message is an activate PDP context request or activate PDN connection request message and the instructions to detach is comprised in a detach request message.

22. The first network node according to claim 12, wherein the receiver is further configured to obtain the information about rejection of the request message internally within the first network node when the received request message is an activate PDP context request or activate PDN connection request message and the instructions to detach is comprised in a detach request message.

* * * * *